July 18, 1950
F. W. OFELDT
2,515,792
SPRAYING MACHINE
Filed Nov. 22, 1946
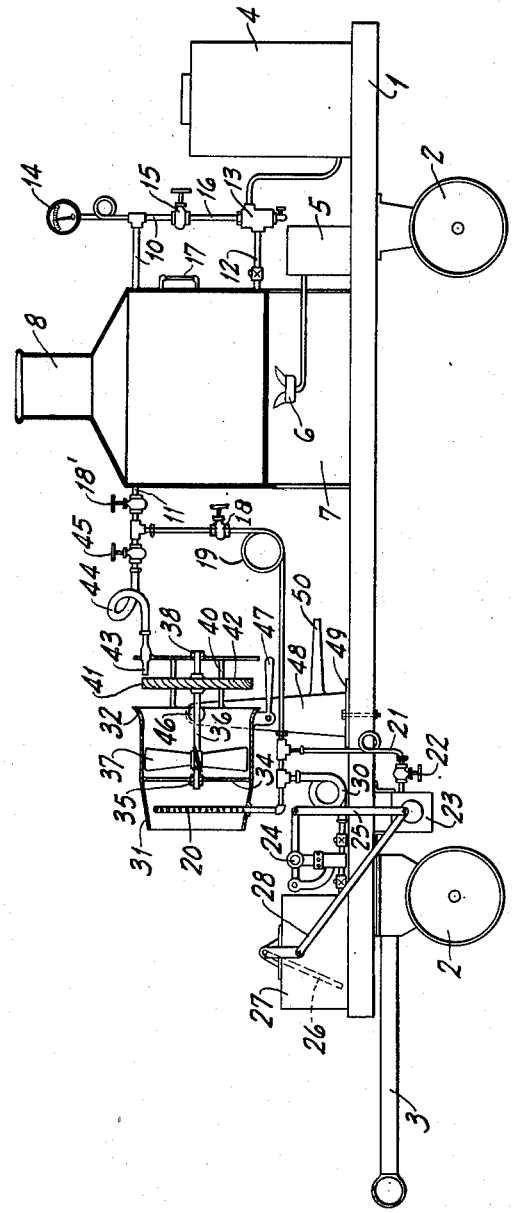
INVENTOR.
Frank W. Ofeldt
BY
Edward A. Lawrence
his attorney Patented July 18, 1950

2,515,792

UNITED STATES PATENT OFFICE 2,515,792

SPRAYING MACHINE

Frank W. Ofeldt, Carnot, Pa., assignor to Homestead Valve Manufacturing Company, Coraopolis, Pa., a corporation of Pennsylvania Application November 22, 1946, Serial No. 711,522

1 Claim. (Cl. 261—16)

This invention relates generally to spraying apparatus and more particularly to the method and apparatus for generating and distributing a spray mixture.

This invention may be advantageously employed for agricultural purposes wherein germicides may be compounded to produce a spray mixture for treating soil, vegetation and trees and for disinfecting buildings and animals.

This invention contemplates production of a vapor under pressure from a liquid by the use of heat for the atomization of a spraying substance which is then forcibly distributed over the area to be treated.

The principal object of this invention is the provision of a method and apparatus for vaporizing or atomizing a mixture and then distributing it over the subject to be treated by the mixture.

Another object of this invention is the method and apparatus for generating and then distributing an atomized or vaporized mixture by blowing.

Another object of this invention is the provision of a self-contained machine for generating a vaporized or atomized mixture and distributing it by blowing the vapor over the subject to be treated.

Another object of this invention is the provision of a method and apparatus for generating and distributing a vaporized or atomized mixture from a highly concentrated solution.

Another object is the method and apparatus for generating a vaporized mixture and controlling the distribution of the same by blowing the generated vapor in any predetermined direction.

Another object of this invention is the provision of a method and apparatus for producing and distributing a spray mixture which employs a minimum amount of liquid in the generation of a spray mixture.

Another object is the production of a mixture of a liquid and the vapor of a liquid by the use of heat which generates a pressure for the atomization of a spraying substance which is then forcibly distributed over the area to be treated.

Another object of this invention is the provision and method of atomizing a spray mixture, blowing the spray mixture in any predetermined direction and controlling the size of the atomized particles independently of the velocity of the air from the blower by varying the heat applied to the spray mixture.

Other objects and advantages appear hereinafter in the following description and claim.

A practical embodiment illustrating the principles of this invention are shown in the accompanying drawing wherein a view of the apparatus is illustrated with portions thereof shown in section.

A spray generating apparatus of similar character is disclosed in Letters Patent Nos. 1,855,866; 1,925,457; 1,925,643; 1,970,971; 2,062,925; 2,077,-257; and 2,128,263, all of which were granted to the present inventor. In a spray generating apparatus of this character the pressure is produced by turning a portion of the liquid into a vapor or steam, the generated pressure of which is employed for the purpose of atomizing the liquid spray mixture upon discharge. The amount of vapor or steam generated is determined by the amount of heat supplied as correlated with the amount of liquid supplied to the apparatus or by the amount of steam or vapor supplied relative to the supply of the spraying substance. The proportions of steam or vapor to the liquid of the mixture may be changed by varying the amount of either the liquid or the heat supplied to the apparatus per unit of time in producing different characters of spray. Thus the greater the amount of heat, the "drier" the spray and the lesser the amount, the "wetter" the spray produced within the limits of the apparatus operating in the latent heat zone with the heat and mixture being correlated.

In a spray generator of this character the soap or other cleaning compositions and germicides, insecticides, or fungicides may be previously mixed in liquid solution and fed through the vapor generating portion of the machine or supplied through the mixture of the vapor and the liquid of the vapor on the outlet side of the generating portion of the machine before the same is atomized by discharge to the atmosphere or to a zone of lower pressure. However in that art the cleaning or germicidal compounds have been heretofore supplied in aqueous solution forming thin liquids. The supply in generating a spray in this manner normally requires a material amount of the conveying liquid such as water. It was discovered that highly concentrated mixtures could be employed to generate a spray wherein such concentrates are highly viscous being in the nature of a concentrate over ten times that of the ordinary liquid mixtures of the same materials. For example thirty gallons of the mixture, which is exceedingly concentrated, may be equal to or more than three hundred gallons of an ordinary liquid mixture of the material. This discovery thus provides a generation of a spray mixture requiring the materially less amount of conveying liquid or water for the production of a highly concentrated spray than was heretofore possible. This is particularly advantageous in the agricultural field wherein the spray generating apparatus is frequently remote of any source of water supply which handicap materially limits the use of the spray generating apparatus owing to the fact that material time and labor are required to continuously replenish the supply of water for the operating of the spray generating apparatus. This discovery represents an important advantage of this invention.

Referring to the drawings, 1 represents a truck or similar mobile device supported by the wheels 2 and providing with a tongue 3 for either drawing or pushing the truck 1 into or adjacent to buildings, over the fields and through the orchard for the purpose of spraying the same. The apparatus disclosed is a self-contained spray generating equipment which may be conveniently arranged on the truck 1 and which comprises the supply tank 4 for receiving a liquid such as water. Fuel such as oil may be contained in the fuel supply tank 5 arranged to feed a burner 6 in the combustion chamber 7. The supply of fuel to the burner 6 may be correlated with the supply of water to the generator 8 if the latter is provided with a coiled heat transfer unit in a manner disclosed in the aforementioned patents. However a generator may be employed to produce steam or a mixture of vapor and water under pressure which does not necessarily require the correlation of the supply of fuel with the supply of water to the generator 8. Thus the burner 6 may be replaced by an ordinary fire grate fed with a fuel such as wood or coal and the generator 8 may be as shown an ordinary boiler chamber having an inlet and outlet 10 and 11 respectively adjacent the top thereof and above the level of the water within the boiler. A connection 12 may be made at the bottom of the boiler for supplying water under pressure to the boiler feed injector 13. When the boiler 8 is filled to the proper level with water and a fire is kindled in the combustion chamber 7 for the purpose of generating steam within the boiler, the pressure of steam will be effective on the pressure indicator 14 connected to the inlet pipe 10. When the sufficient pressure has been generated within the boiler 8 the valve 15 may be opened to permit the flow of steam under pressure from the boiler to the boiler feed injector 13 supplying hot water through the pipe 16, the valve 15 and the inlet pipe 10 to the boiler chamber thereby injecting feed water from the tank 4 to replenish the boiler with water. The valve 15 may be regulated to maintain the proper water level within the boiler 8 by checking a device such as the sight gauge 17.

A generated steam or vapor may be permitted to flow from the boiler through the valve 18 and the flexible line 19, a portion of which is made flexible, to the atomizing nozzle 20. A portion of the steam may be led off the line 19 through a flexible connection 21 and the valve 22 to a variable speed steam motor 23. The steam motor is arranged to actuate the piston of the solution pump 24 through the reach rod 25 and also actuate the agitating member 26 in the concentrated solution or mixture tank 27 through its reach rod and crank mechanism indicated at 28. Thus vapor pressure is employed to pump a concentrated solution such as a germicide or insecticide through the flexible connection 30 to the steam line 19 where it is mixed with the steam or vapor under pressure and is subsequently atomized and discharged from the nozzle 20.

The nozzle 20 is preferably circular in shape and is provided with a series of outlet openings. This nozzle is mounted concentrically within the tunnel 31 adjacent the front end thereof. As shown, this tunnel preferably decreases in the diameter from the inlet to the outlet end, the inlet end being flared as indicated at 32. A spider 34 is positioned within the tunnel intermediate of its ends and is provided with a lined bearing 35 for supporting one end of the shaft 36 on which is mounted the fan 37. The other end of the shaft 36 is mounted in the bearing 38 supported by the frame 40 that is secured in spaced relation from the rear end of the tunnel 31. A turbine wheel 41 is secured to the shaft 36 intermediate of the bearing 38 and the rear end of the tunnel and is provided with a series of blades or buckets 42. The frame 40 is arranged to carry a turbine jet nozzle 43 that is connected by means of a flexible connection 44 and the valve 45 to the steam boiler pressure line 19. Thus by regulating the valve 45 a jet of steam or vapor under pressure may be discharged against the buckets 42 of the turbine wheel 41 for the purpose of rotating the shaft 36 and causing the fan 37 to produce a blast of air which with the exhaust steam is forced through the tunnel and against the rear of the nozzle 20 for the purpose of blowing the atomized spray out of the tunnel. With this arrangement it has been found that the atomized spray may be forced five hundred feet and to saturate a group of trees with a highly concentrated insecticide that will thoroughly envelope the vegetation within this space. Thus a spray nozzle does not have to be held in close proximity to the vegetation being treated as has been the custom when spraying with less concentrated mixtures by the use of only the force generated by the vapors in atomizing the mixture.

The tunnel 31 is provided with a pair of trunnions as indicated at 46 for the purpose of swinging the axis of the tunnel in a vertical plane which may be accomplished by manipulating the lever 47 attached to the bottom of the tunnel. The trunnions in turn are journaled in the post 48 which is arranged to swivel on the base 49 mounted on the deck of the truck 1. This post may be swung horizontally by means of the lever 50. Thus by manipulating the levers 47 and 50 the tunnel 31 may be pointed in any desired direction or swept through any desired panorama for the purpose of spraying vegetation over a selected area.

By properly proportioning or metering the supply of the concentrated mixture, through the steam motor 23, with the supply of steam or vapor mixture discharged through the line 19, the spray produced may be made to properly and adequately treat the vegetation with a minimum amount of water.

I claim:

The method of producing and distributing a spray substance which consists in the steps of metering under pressure a predetermined quantity of highly concentrated spraying substance into a stream of vapor under pressure, atomizing the spraying substance by discharging it with the vapor under pressure, regulating the size of atomization of the spraying substance by controlling its metered supply and the pressure of the vapor, generating an air blast by the vapor pressure for blowing the atomized spraying substance to distribute it over the area to be treated, and regulating the vapor pressure to change the velocity of the air blast to control the distribution of the atomized spraying substance.

FRANK W. OFELDT.

REFERENCES CITED

The following references are of record in the file of this patent:

UNITED STATES PATENTS

| Number | Name | Date |
|---|---|---|
| 792,402 | Cramer | June 13, 1905 |
| 2,128,263 | Ofeldt | Apr. 30, 1938 |
| 2,238,120 | Launder | Apr. 15, 1941 |
| 2,374,955 | Raper | May 1, 1945 |
| 2,429,374 | Shade | Oct. 21, 1947 |